(12) United States Patent
Fu et al.

(10) Patent No.: US 9,906,406 B2
(45) Date of Patent: Feb. 27, 2018

(54) ALERTING METHOD AND MOBILE TERMINAL

(71) Applicant: Huawei Technologies Co., Ltd., Shenzhen (CN)

(72) Inventors: Jiali Fu, Shenzhen (CN); Huimin Zhang, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/461,597

(22) Filed: Mar. 17, 2017

(65) Prior Publication Data

US 2017/0187566 A1    Jun. 29, 2017

Related U.S. Application Data

(63) Continuation of application No. PCT/CN2015/076024, filed on Apr. 8, 2015.

(30) Foreign Application Priority Data

Sep. 19, 2014   (CN) .......................... 2014 1 0483190

(51) Int. Cl.
*H04B 1/38* (2015.01)
*H04L 12/24* (2006.01)
*H04M 1/02* (2006.01)
*H04L 29/06* (2006.01)

(52) U.S. Cl.
CPC ........ *H04L 41/069* (2013.01); *H04M 1/0202* (2013.01); *H04L 65/608* (2013.01); *H04M 2250/20* (2013.01)

(58) Field of Classification Search
CPC ..................................................... H04L 41/069
USPC .................................. 455/404.1, 414.1, 566
See application file for complete search history.

(56) References Cited

U.S. PATENT DOCUMENTS

2014/0085334 A1    3/2014  Payne
2015/0094118 A1*   4/2015  Rodolico ............ H04M 1/0264
                                                    455/566

FOREIGN PATENT DOCUMENTS

| CN | 101827150 A | 9/2010 |
| CN | 101986673 A | 3/2011 |
| CN | 103312899 A | 9/2013 |
| CN | 103465857 A | 12/2013 |
| CN | 103809855 A | 5/2014 |
| CN | 104933825 A | 9/2015 |

OTHER PUBLICATIONS

Machine Translation and Abstract of Chinese Publication No. CN103809855, May 21, 2014, 3 pages.

(Continued)

*Primary Examiner* — Joel Ajayi
(74) *Attorney, Agent, or Firm* — Conley Rose, P.C.

(57) ABSTRACT

An alerting method and a mobile terminal, where the method and terminal comprise obtaining real-time data of an environment around the mobile terminal using a sensor, detecting whether the real-time environmental data contains an object that affects user behavior, and generating alert information according to the real-time environmental data when the real-time environmental data contains an object that affects user behavior.

20 Claims, 6 Drawing Sheets

(56) References Cited

OTHER PUBLICATIONS

Machine Translation and Abstract of Chinese Publication No. CN101986673, Part 1, Mar. 16, 2011, 5 pages.
Machine Translation and Abstract of Chinese Publication No. CN101986673, Part 2, Mar. 16, 2011, 2 pages.
Machine Translation and Abstract of Chinese Publication No. CN103465857, Dec. 25, 2013, 9 pages.
Foreign Communication From a Counterpart Application, PCT Application No. PCT/CN2015/076024, English Translation of International Search Report dated Jul. 10, 2015, 2 pages.
Foreign Communication From a Counterpart Application, PCT Application No. PCT/CN2015/076024, English Translation of Written Opinion dated Jul. 10, 2015, 6 pages.

\* cited by examiner

ALERTING METHOD AND MOBILE TERMINAL

CROSS-REFERENCE TO RELATED APPLICATIONS

This application is a continuation of International Patent Application No. PCT/CN2015/076024 filed on Apr. 8, 2015, which claims priority to Chinese Patent Application No. 201410483190.7 filed on Sep. 19, 2014. The disclosures of the aforementioned applications are hereby incorporated by reference in their entireties.

TECHNICAL FIELD

The present disclosure relates to the field of communications technologies, and in particular, to an alerting method and a mobile terminal.

BACKGROUND

A mobile terminal displays only information related to an application itself when displaying the application. For example, when a user is playing a game using a mobile terminal, a display screen of the mobile terminal displays only information related to the game, such as a game image, a game-related recommendation, and the like. However, it often happens that a user is using a mobile terminal while walking and pays no attention to what is going on around and therefore has no idea about a surrounding environment. In this case, if there is potential danger in the surrounding environment, safety of the user is greatly threatened. Therefore, it is necessary to provide a method to resolve this problem.

SUMMARY

In view of this, the present disclosure provides an alerting method and a mobile terminal, which can ensure safety of a user.

According to a first aspect, an embodiment of the present disclosure provides an alerting method, including obtaining real-time data of an environment around a mobile terminal using a sensor, detecting whether the real-time environmental data contains an object that affects user behavior, and generating alert information according to the real-time environmental data if the real-time environmental data contains an object that affects user behavior.

With reference to the first aspect, in a first implementation manner of the first aspect, the sensor includes one or more of a camera, a BLUETOOTH sensor, an infrared sensor, a WI-FI sensor, a visible light sensor, an ultrasonic sensor, a radio frequency identification (RFID) sensor, a ZIGBEE sensor, or an ultra-wideband sensor.

With reference to the first aspect, in a second implementation manner of the first aspect, an object that affects user behavior is obtained by means of user presetting, automatic identification of the terminal, or obtaining network data.

With reference to the first implementation manner of the first aspect, in a third implementation manner of the first aspect, the environmental data includes one or more types of the data, a sound, an image, a height of an object, a thickness of the object, or a distance and an angle between the object and the mobile terminal that are detected by the sensor.

With reference to the first aspect, in a fourth implementation manner of the first aspect, after detecting whether the real time environmental data includes an object that affects user behavior, the method further includes generating a real-time environmental image according to the real time environmental data, where the real time environmental image is visibly displayed as a background on a display screen of the mobile terminal.

With reference to the fourth implementation manner of the first aspect, in a fifth implementation manner of the first aspect, the real-time environmental image is an image of a real-world scene or a diagram of a virtual structure.

According to a second aspect, an alerting method provided by an embodiment of the present disclosure includes obtaining a real-time image collected by a camera of a mobile terminal, where the real-time image is visibly displayed as a background on a display screen of the mobile terminal, and a foreground displayed on the display screen of the mobile terminal is an application on the mobile terminal, determining whether the real-time image contains an object that affects user behavior, and alerting a user if the real-time image contains an object that affects user behavior.

With reference to the second aspect, in a first implementation manner of the second aspect, before obtaining a real-time image collected by a camera of a mobile terminal, the method further includes detecting a status of the mobile terminal, and turning on the camera of the mobile terminal and using the camera of the mobile terminal to collect the real-time image when detecting that the mobile terminal is in a preset state, where the preset state includes being in motion and/or being outdoors.

With reference to the second aspect or the first implementation manner of the second aspect, in a second implementation manner of the second aspect, before obtaining a real-time image collected by a camera of a mobile terminal, the method further includes determining, according to content displayed in the foreground of the mobile terminal, to turn on a front camera and/or a rear camera of the mobile terminal, and obtaining a real-time image collected by a camera of a mobile terminal includes obtaining the real-time image collected by the front camera and/or the rear camera of the mobile terminal.

With reference to the second implementation manner of the second aspect, in a third implementation manner of the second aspect, when the obtained real-time image is collected by the front camera and the rear camera of the mobile terminal, a real-time image collected by the front camera and a real-time image collected by the rear camera are visibly displayed as the background on the display screen of the mobile terminal in a split-screen manner, or a real-time image collected by the front camera and a real-time image collected by the rear camera are visibly displayed as the background on the display screen of the mobile terminal in a switching manner according to a preset rule.

With reference to the second aspect, or the first implementation manner of the second aspect, or the second implementation manner of the second aspect, or the third implementation manner of the second aspect, in a fourth implementation manner of the second aspect, after obtaining a real-time image collected by a camera of a mobile terminal, where the real-time image is visibly displayed as a background on a display screen of the mobile terminal, and a foreground displayed on the display screen of the mobile terminal is an application on the mobile terminal, the method further includes obtaining ambient luminance of the mobile terminal and/or luminance of the background, and adjusting transparency of the foreground according to the ambient luminance of the mobile terminal and/or the luminance of the background such that lower ambient luminance of the mobile terminal and/or lower luminance of the background make/makes higher transparency of the foreground.

According to a third aspect, a mobile terminal provided by an embodiment of the present disclosure includes a data obtaining unit configured to obtain real-time data of an environment around the mobile terminal using a sensor, a detection unit configured to detect whether the real-time environmental data contains an object that affects user behavior, and an alert unit configured to generate alert information according to the real-time environmental data when the real-time environmental data contains an object that affects user behavior.

With reference to the third aspect, in a first implementation manner of the third aspect, the sensor includes one or more of a camera, a BLUETOOTH sensor, an infrared sensor, a WI-FI sensor, a visible light sensor, an ultrasonic sensor, an RFID sensor, a ZIGBEE sensor, or an ultrawideband sensor.

With reference to the third aspect, in a second implementation manner of the third aspect, the detection unit detects, by means of user presetting, automatic identification of a terminal, or obtaining network data, an object that affects user behavior.

With reference to the first implementation manner of the third aspect, in a third implementation manner of the third aspect, the environmental data includes one or more types of the following data a sound, an image, a height of an object, a thickness of the object, or a distance and an angle between the object and the mobile terminal that are detected by the sensor.

With reference to the first implementation manner of the third aspect, in a fourth implementation manner of the third aspect, the mobile terminal further includes an environmental image generation unit configured to generate a real-time environmental image according to the real-time environmental data, where the real-time environmental image is visibly displayed as a background on a display screen of the mobile terminal.

With reference to the fourth implementation manner of the third aspect, in a fifth implementation manner of the third aspect, the real-time environmental image is an image of a real-world scene or a diagram of a virtual structure.

According to a fourth aspect, a mobile terminal provided by an embodiment of the present disclosure includes an image obtaining unit configured to obtain a real-time image collected by a camera of the mobile terminal, where the real-time image is visibly displayed as a background on a display screen of the mobile terminal, and a foreground displayed on the display screen of the mobile terminal is an application on the mobile terminal, a judgment unit configured to determine whether the real-time image contains an object that affects user behavior, and an alert unit configured to alert a user when the real-time image contains an object that affects user behavior.

With reference to the fourth aspect, in a first implementation manner of the fourth aspect, the mobile terminal further includes a detection unit configured to detect a status of the mobile terminal, and a turn-on unit configured to turn on the camera of the mobile terminal and use the camera of the mobile terminal to collect the real-time image when the detection unit detects that the mobile terminal is in a preset state, where the preset state includes being in motion and/or being outdoors.

With reference to the fourth aspect or the first implementation manner of the fourth aspect, in a second implementation manner of the fourth aspect, the mobile terminal further includes a determining unit configured to determine, according to content displayed in the foreground of the mobile terminal, to turn on a front camera and/or a rear camera of the mobile terminal, and the image obtaining unit is further configured to obtain the real-time image collected by the front camera and/or the rear camera of the mobile terminal.

With reference to the second implementation manner of the fourth aspect, in a third implementation manner of the fourth aspect, when the real-time image obtained by the image obtaining unit is collected by the front camera and the rear camera of the mobile terminal, a real-time image collected by the front camera and a real-time image collected by the rear camera are visibly displayed as the background on the display screen of the mobile terminal in a split-screen manner, or a real-time image collected by the front camera and a real-time image collected by the rear camera are visibly displayed as the background on the display screen of the mobile terminal in a switching manner according to a preset rule.

With reference to the fourth aspect, or the first implementation manner of the fourth aspect, or the second implementation manner of the fourth aspect, or the third implementation manner of the fourth aspect, in a fourth implementation manner of the fourth aspect, the mobile terminal further includes a luminance obtaining unit configured to obtain ambient luminance of the mobile terminal and/or luminance of the background, and an adjustment unit configured to adjust transparency of the foreground according to the ambient luminance of the mobile terminal and/or the luminance of the background such that lower ambient luminance of the mobile terminal and/or lower luminance of the background make/makes higher transparency of the foreground.

In the embodiments of the present disclosure, a mobile terminal obtains real-time data of an environment around the mobile terminal using a sensor, detects whether the real-time environmental data contains an object that affects user behavior, and generates alert information according to the real-time environmental data if the real-time environmental data contains an object that affects user behavior. In the embodiments of the present disclosure, a user can learn a situation around in real time according to the alert information generated by the mobile terminal in order to avoid potential danger effectively.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person skilled in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure shall fall within the protection scope of the present disclosure.

Figure 1:
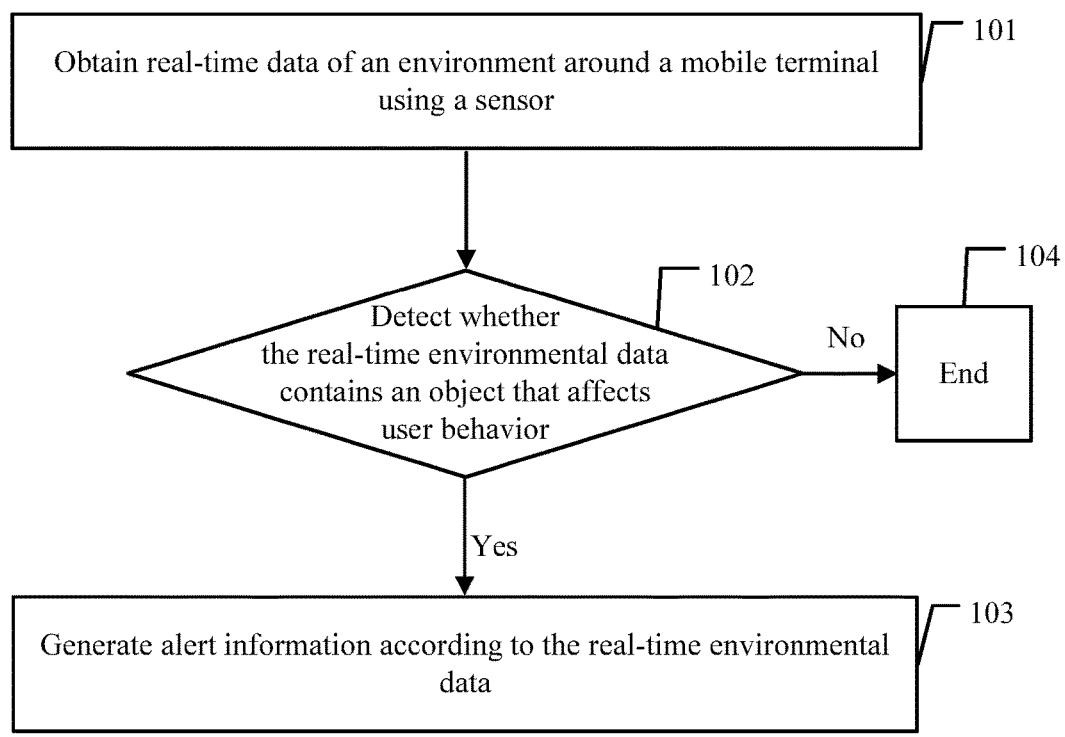
FIG. 1 is a schematic diagram of an embodiment of an alerting method provided in the present disclosure.

Referring to FIG. 1, in one embodiment, an alerting method of the present disclosure includes the following steps.

Step 101: Obtain real-time data of an environment around a mobile terminal using a sensor.

The sensor may be one or more of various sensors such as a camera, a BLUETOOTH sensor, an infrared sensor, a WI-FI sensor, a visible light sensor, an ultrasonic sensor, an RFID sensor, a ZIGBEE sensor, or an ultra-wideband sensor.

Using the sensor, the real-time environmental data of the mobile terminal such as a sound around the mobile terminal, an image around the mobile terminal, a height of an object around the mobile terminal, a thickness of the object around the mobile terminal, or a distance and an angle between the object and the mobile terminal can be measured.

According to the real-time environmental data of the mobile terminal, an image of a real-world scene may be obtained directly or a two dimensional (2D) or three dimensional (3D) real-time structural diagram of the surrounding environment may be generated synchronously.

The image of the real-world scene or the real-time structural diagram may be visibly displayed as a background on a display screen of the mobile terminal, and a foreground displayed on the display screen of the mobile terminal is an application on the mobile terminal.

In this embodiment, the application on the mobile terminal displayed in the foreground includes but is not limited to short message service (SMS), an Internet browser, an electronic book (e-book), an album, and the like. In specific implementation, foreground display may be made translucent by adjusting transparency of the foreground display such that content displayed in the background is visible.

Step 102: Detect whether the real-time environmental data contains an object that affects user behavior, and execute step 103 if the real-time environmental data contains an object that affects user behavior, or execute step 104 to end the processing if the real-time environmental data does not contain an object that affects user behavior.

The object that affects user behavior may be a person or an object that imposes a potential threat to a user, for example, a person, a vehicle, a puddle, or an obstacle.

Criteria for determining an object that affects user behavior may include the following few.

1: User presetting.

The user may set rules for objects that affect user behavior in various scenarios, for example, a person or a vehicle near a street, an obstacle in a park, and the like.

2: The mobile device itself automatically identifies affecting objects in various scenarios by way of machine learning.

For example, an analytic learning method is applied. Collected data and historical data are stored and generalized such that experience in finding a solution for a past scenario is used to guide finding of a solution for a new scenario, and related data is effectively used to generate a corresponding rule for identifying an object that affects user behavior.

3: The real-time environmental data of the mobile terminal is uploaded to a network side, and an affecting object in the current user environment is obtained from the network side.

The real-time data collected by the sensor of the mobile terminal is uploaded to the network side. The network side may be a server, a social networking site, or the like.

Other data related to the current environment may be obtained from the network side. The data is analyzed and alert information is generated. For example, the collected data is uploaded to the network side if currently the mobile terminal can collect only data of the environment in front of and behind the mobile terminal. The network side may find data of the current environment on the left, right, upper and lower sides by matching according to the current data. The mobile terminal obtains the network data from the network side and then analyzes the data and generates alert information.

Alternatively, the network side may directly analyze data according to a combination of the uploaded collected data and network side data, and send alert information to the mobile terminal in real time.

It should be noted that the foregoing determining criteria may be used for processes of determining an object that affects user behavior in the following embodiments.

Step 103: Generate alert information according to the real-time environmental data.

An alerting manner may be, for example, vibration or ringing of the mobile terminal itself, or may be, for example, a voice, text, or picture generated according to a preset object, or may be quitting of an application, which is not limited and may be preset according to an actual need.

In this embodiment, a real-time structural diagram of an environment around a mobile terminal is obtained, and the mobile terminal analyzes the real-time structural diagram, and generates alert information when the structural diagram contains an object that affects user behavior.

Alternatively, a real-time structural diagram of an environment around a mobile terminal may be obtained, and the real-time structural diagram is visibly displayed to a user as a background.

Alternatively, a real-time structural diagram of an environment around a mobile terminal may be obtained, the real-time structural diagram is visibly displayed to a user as a background, and the mobile terminal further analyzes the real-time structural diagram displayed in the background, and generates alert information when the real-time structural diagram contains an object that affects user behavior. In this way, the user can learn a situation around according to the image displayed in the background and the alert from the mobile terminal in order to avoid potential danger effectively.

Whether the real-time structural diagram is displayed on the mobile terminal and whether the alert information is generated may be preset by the user or may be automatically selected by the device.

For ease of understanding, the following uses an example that the sensor is a sensor other than a camera to describe the alerting method provided in the embodiment of the present disclosure, which includes as follows.

A mobile terminal obtains real-time data of an environment around the mobile terminal using a sensor.

The sensor may be one or more sensors such as an infrared sensor, an ultrasonic sensor, an RFID sensor, a WI-FI sensor, a ZIGBEE sensor, or an ultra-wideband sensor.

Using the sensor, real-time data such as lengths and heights of a person, an object, and other things around the mobile terminal, and distances and angles between them and the mobile terminal may be measured.

A 2D or 3D real-time structural diagram of the surrounding environment may be generated according to the real-time environmental data of the mobile terminal.

The real-time structural diagram may be visibly displayed as a background on a display screen of the mobile terminal, and a foreground displayed on the display screen of the mobile terminal is an application on the mobile terminal.

In this embodiment, the application on the mobile terminal displayed in the foreground includes but is not limited to SMS, an Internet browser, an e-book, an album, and the like. In specific implementation, foreground display may be made translucent by adjusting transparency of the foreground display such that content displayed in the background is visible.

The mobile terminal determines whether the real-time image contains an object that affects user behavior.

The object that affects user behavior may be a person or an object that imposes a potential threat to the user, for example, a person, a vehicle, a puddle, or an obstacle.

The mobile terminal generates alert information according to the real-time environmental data if the real-time environmental data contains an object that affects user behavior.

An alerting manner may be, for example, vibration or ringing of the mobile terminal itself, or may be, for example, a voice, text, or picture generated according to a preset object, or may be quitting of an application, which is not limited and may be preset according to an actual need.

In this embodiment, a real-time structural diagram of an environment around a mobile terminal is obtained, and the mobile terminal analyzes the real-time structural diagram, and generates alert information when the structural diagram contains an object that affects user behavior.

Alternatively, a real-time structural diagram of an environment around a mobile terminal may be obtained, and the real-time structural diagram is visibly displayed to a user as a background.

Alternatively, a real-time structural diagram of an environment around a mobile terminal may be obtained, the real-time structural diagram is visibly displayed to a user as a background, and the mobile terminal further analyzes the real-time structural diagram displayed in the background, and generates alert information when the real-time structural diagram contains an object that affects user behavior. In this way, the user can learn a situation around according to the image displayed in the background and the alert from the mobile terminal in order to avoid potential danger effectively.

Whether the real-time structural diagram is displayed on the mobile terminal and whether the alert information is generated may be preset by the user, or may be automatically selected by the device.

Figure 2:
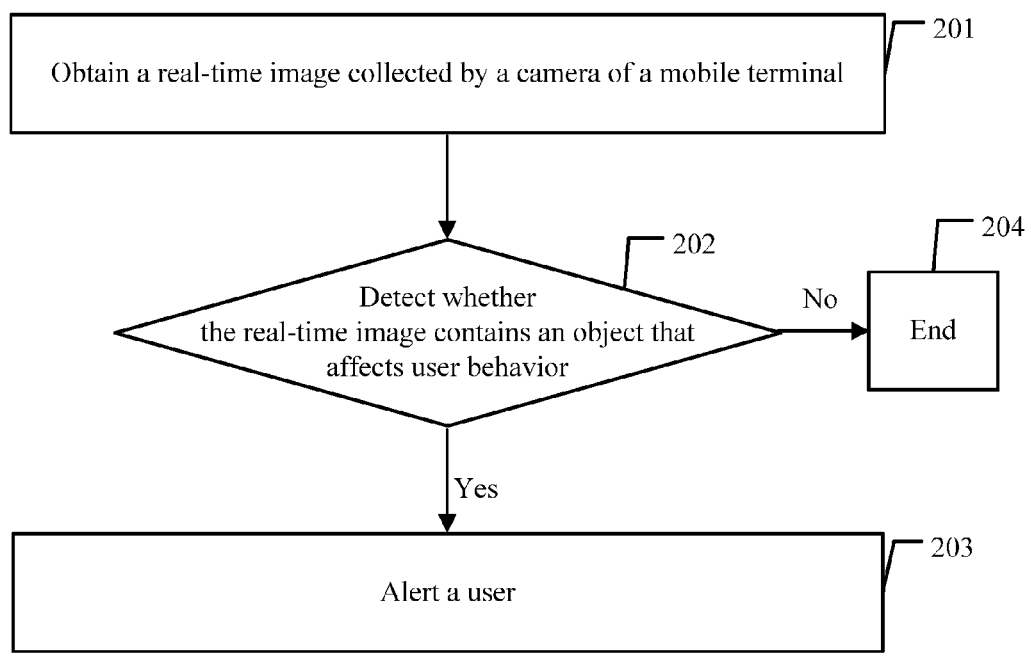
FIG. 2 is a schematic diagram of another embodiment of an alerting method provided in the present disclosure.

The following uses an example that the sensor is a camera to describe the alerting method provided in the embodiment of the present disclosure. Referring to FIG. 2, the method of this embodiment includes the following steps.

Step 201: Obtain a real-time image collected by a camera of a mobile terminal.

The real-time image contains a person, an object, and other things around the mobile terminal.

The real-time image may be visibly displayed as a background on a display screen of the mobile terminal, and a foreground displayed on the display screen of the mobile terminal is an application on the mobile terminal.

In this embodiment, the application on the mobile terminal that is displayed in the foreground includes but is not limited to SMS, an Internet browser, an e-book, an album, and the like. In specific implementation, foreground display may be made translucent by adjusting transparency of the foreground display such that content displayed in the background is visible.

Step 202: Detect whether the real-time image contains an object that affects user behavior, and execute step 203 if the real-time image contains an object that affects user behavior, or execute step 204 to end the processing if the real-time image does not contain an object that affects user behavior.

The object that affects user behavior may be a person or an object that imposes a potential threat to the user, for example, a person, a vehicle, a puddle, or an obstacle.

Step 203: Alert a user.

An alerting manner may be, for example, vibration or ringing of the mobile terminal itself, or may be, for example, a voice, text, or picture generated according to a preset object, or may be quitting of an application, which is not limited and may be preset according to an actual need.

In this embodiment, a real-time image collected by a camera of a mobile terminal is obtained, and the mobile terminal analyzes the real-time image, and generates alert information when the real-time image contains an object that affects user behavior.

Alternatively, a real-time image collected by a camera of a mobile terminal may be obtained, and the real-time image is visibly displayed to a user as a background.

Alternatively, a real-time image collected by a camera of a mobile terminal may be obtained and the real-time image is visibly displayed to a user as a background, and the mobile terminal further analyzes the real-time image displayed in the background and generates alert information when the real-time image contains an object that affects user behavior. In this way, the user can learn a situation around according to the image displayed in the background and the alert from the mobile terminal so as to avoid potential danger effectively.

Whether the real-time image is displayed on the mobile terminal and whether the alert information is generated may be preset by the user, or may be automatically selected by the device.

Figure 3:
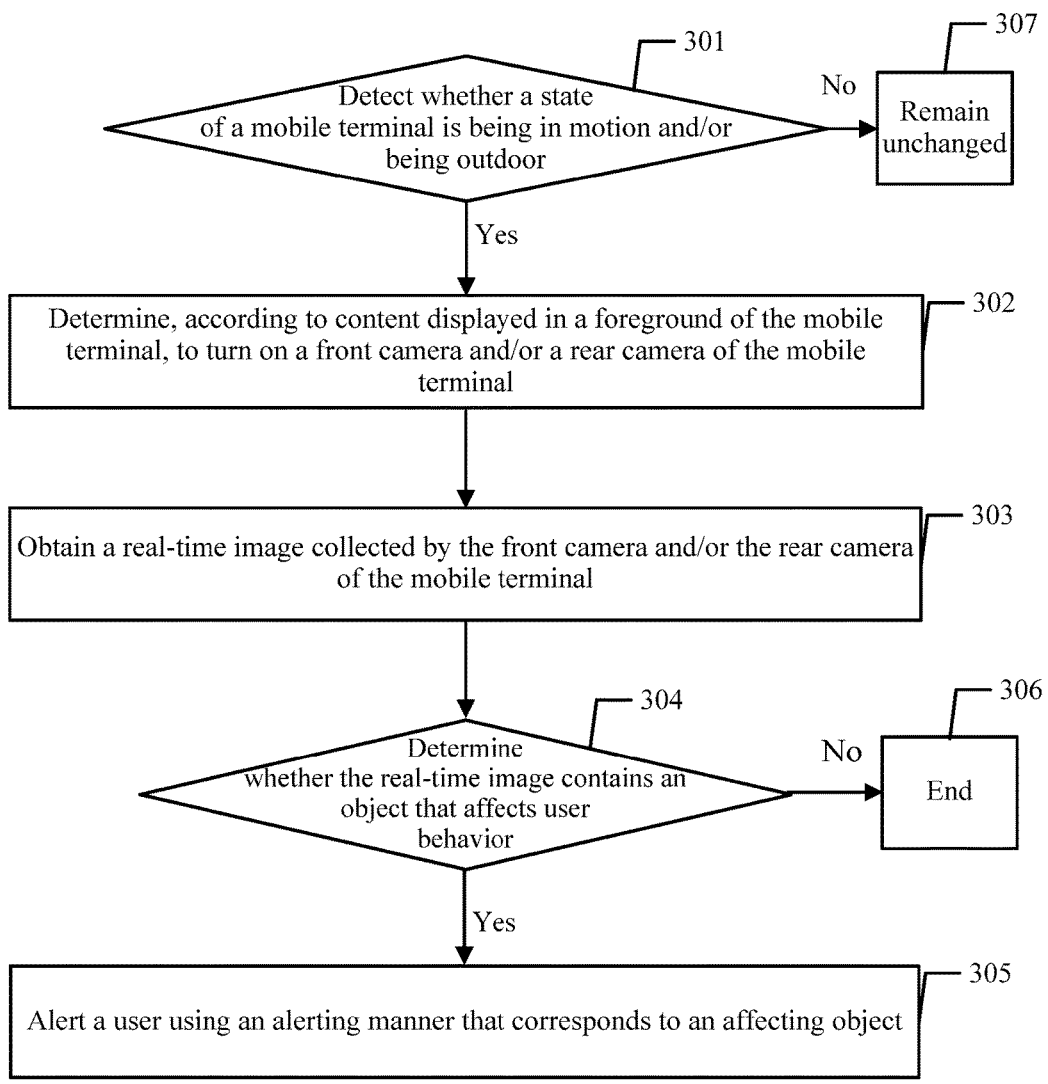
FIG. 3 is a schematic diagram of another embodiment of an alerting method provided in the present disclosure.

For further understanding of the alerting method with the sensor being a camera, a specific embodiment is used in the following description. Referring to FIG. 3, the method of this embodiment includes the following steps.

Step 301: Detect whether a state of a mobile terminal is being in motion and/or being outdoors, and execute step 302 if the state of the mobile terminal is being in motion and/or being outdoors, or otherwise execute step 307 to remain unchanged.

In specific implementation, a sensor may be used to detect the state of the mobile terminal. The sensor may be a light sensor, a noise sensor, a motion sensor, an acceleration sensor, or the like. Whether the mobile terminal is indoors or outdoors and whether the mobile terminal is in motion or static are determined according to the data detected by the sensor.

Generally, when the mobile terminal is indoors and/or static, a surrounding environment is relatively stable, and a probability that a user is exposed to danger is relatively low. Therefore, performing no processing is practicable when the mobile terminal is indoors and/or static.

Step 302: Determine, according to content displayed in a foreground of the mobile terminal, to turn on a front camera and/or a rear camera of the mobile terminal.

The probability that the user is exposed to danger is higher, and the user needs to be alerted accordingly when the mobile terminal is outdoors and/or in motion.

Further, in this embodiment, after the mobile terminal is detected to be outdoors and/or in motion, that the front camera and/or the rear camera of the mobile terminal are/is to be turned on is determined according to the content displayed in the foreground. For example, when the content displayed in the foreground of the mobile terminal has a high importance degree, or refers to user privacy and needs to be kept secret, the front camera of the mobile terminal needs to be turned on to collect a real-time image behind the user, thereby alerting the user of potential danger existing at the back environment. When the content displayed in the foreground of the mobile terminal refers to no privacy or other important information, for example, when the user uses the mobile terminal to surf the Internet or read an e-book, an area in front of the user is a main area in which danger exits. In this case, the rear camera of the mobile terminal may be turned on to collect a real-time image in front, thereby alerting the user of potential danger existing in front.

Step 303: Obtain a real-time image collected by the front camera and/or the rear camera of the mobile terminal.

The real-time image collected by the front camera and/or the rear camera of the mobile terminal is visibly displayed as a background on a display screen of the mobile terminal, and the foreground displayed on the display screen of the mobile terminal is an application on the mobile terminal.

In specific implementation, foreground display may be made translucent by adjusting transparency of the foreground display such that content displayed in the background is visible.

Additionally, when the obtained real-time image is collected by the front camera and the rear camera of the mobile terminal, a real-time image collected by the front camera and a real-time image collected by the rear camera are visibly displayed as the background on the display screen of the mobile terminal in a split-screen manner, or a real-time image collected by the front camera and a real-time image collected by the rear camera are visibly displayed as the background on the display screen of the mobile terminal in a switching manner according to a preset rule. The preset rule may be a fixed switching cycle, or displaying in a switching manner when the real-time image collected by a given camera is greatly changed. There may be one or more front cameras and one or more rear cameras.

Step 304: Determine whether the real-time image contains an object that affects user behavior, and execute step 305 if the real-time image contains an object that affects user behavior, or execute step 306 to end the processing if the real-time image does not contain an object that affects user behavior.

The object that affects user behavior may be a person or an object that imposes a potential threat to the user, for example, a vehicle, a puddle, an obstacle, or a person appeared behind the user.

Step 305: Alert a user using an alerting manner that corresponds to an affecting object.

In specific implementation, a unified alerting manner may be used for all objects to alert the user, or a corresponding alerting manner may be preset for each preset object, and a corresponding alerting manner may be used to alert the user when a preset object is detected appearing in the real-time image. For example, the application is terminated when the preset object is a vehicle, and a voice or vibration alert is generated when the preset object is a puddle.

Additionally, different alerting manners may be used according to a privacy degree or an importance degree of the foreground content. For example, when the importance degree of the foreground content is high, a voice alert is used when a person is detected behind the user. When the importance degree of the foreground content is average, a text or picture alert is generated when a person is detected behind the user. Alternatively, an emergency degree of a current scenario is determined when the real-time image is detected to contain a preset object, and different alerting manners are used for alerting in scenarios with different emergency degrees. For example, when the real-time image is detected to contain a vehicle, a distance from the vehicle to the mobile terminal may be detected. A nearer distance between the vehicle and the mobile terminal indicates a higher emergency degree of the current scenario. For a scenario with a relatively high emergency degree, a drastic alerting manner, for example, a voice, ringing, or application quitting, may be used. For a scenario with an average emergency degree, a less drastic alerting manner, for example, vibration or generation of a text or picture alert, may be used.

Additionally, after step 303 and step 305, ambient luminance of the mobile terminal and/or luminance of the content displayed in the background of the mobile terminal may further be obtained. Transparency of the foreground is adjusted according to the ambient luminance and/or the luminance of the background of the mobile terminal such that lower ambient luminance of the mobile terminal and/or lower luminance of the background make/makes higher transparency of the foreground. This can ensure that the content displayed in the background and the content displayed in the foreground of the mobile terminal are relatively clear and visible.

It should be noted that in this embodiment, whether the camera of the mobile terminal is to be turned on is automatically determined using steps 301 and 302 in combination. In practical application, however, whether the camera is turned on may be determined using step 301 or step 302 alone. This means that the camera of the mobile terminal is automatically turned on when the mobile terminal is detected to be outdoors and/or in motion. Alternatively, whether the camera is to be turned on is determined according to the content displayed in the foreground of the mobile terminal. For example, the camera of the mobile terminal is automatically turned on when the content displayed in the foreground is relatively important or refers to privacy. Further, whether the front camera or the rear camera of the mobile terminal is turned on may be preset, or the user may be asked to make a selection. In addition, the camera of the mobile terminal may be not automatically turned on based on determining of the mobile terminal, but manually turned on by the user.

In this embodiment, a mobile terminal may automatically turn on a camera according to a status of the mobile terminal and content displayed in a foreground, and use a real-time image collected by the camera. The real-time image is visibly displayed to a user as a background. The mobile terminal also analyzes the real-time image displayed in the background, and alerts the user when the real-time image contains an object that affects user behavior. In this way, the user can learn a situation around according to the real-time image displayed in the background and the alert from the mobile terminal in order to avoid potential danger effectively.

Figure 4:
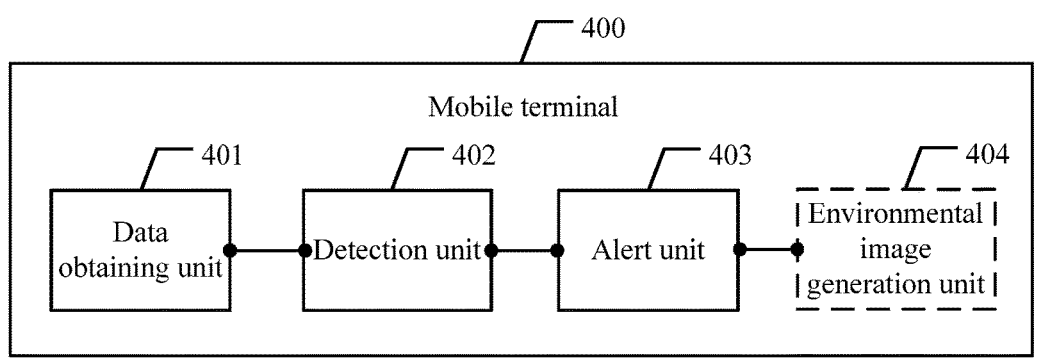
FIG. 4 is a schematic diagram of an embodiment of a mobile terminal provided in the present disclosure.

The following describes a mobile terminal in an embodiment of the present disclosure. Referring to FIG. 4, the mobile terminal 400 in this embodiment includes a data obtaining unit 401 configured to obtain real-time data of an environment around the mobile terminal using a sensor, a detection unit 402 configured to detect whether the real-time environmental data contains an object that affects user behavior, and an alert unit 403 configured to generate alert information according to the real-time environmental data when the real-time environmental data contains an object that affects user behavior.

The mobile terminal 400 may further include an environmental image generation unit 404, where the environmental image generation unit 404 is configured to generate a real-time environmental image according to the real-time environmental data, and the real-time environmental image is visibly displayed as a background on a display screen of the mobile terminal.

For ease of understanding, the following uses a specific embodiment to describe an interaction process of the units in the mobile terminal 400, which is as follows.

The data obtaining unit 401 obtains real-time data of an environment around the mobile terminal using a sensor. The sensor may be one or more of various sensors such as a camera, a BLUETOOTH sensor, an infrared sensor, a WI-FI sensor, a visible light sensor, an ultrasonic sensor, an RFID sensor, a ZIGBEE sensor, or an ultra-wideband sensor.

Using the sensor, the real-time environmental data of the mobile terminal 400 such as a sound, an image, a height of an object, a thickness of the object, or a distance and an angle between the object and the mobile terminal 400 can be measured.

The environmental image generation unit 404 may, according to the real-time environmental data of the mobile terminal 400 obtained by the data obtaining unit 401, obtain an image of a real-world scene directly or generate a 2D or 3D real-time structural diagram of the surrounding environment synchronously.

The image of the real-world scene or the real-time structural diagram may be visibly displayed as a background on a display screen (not shown) of the mobile terminal 400, and a foreground displayed on the display screen of the mobile terminal 400 is an application on the mobile terminal 400.

In this embodiment, the application on the mobile terminal 400 displayed in the foreground includes but is not limited to SMS, an Internet browser, an e-book, an album, and the like. In specific implementation, foreground display may be made translucent by adjusting transparency of the foreground display such that content displayed in the background is visible.

The detection unit 402 detects whether the real-time environmental data obtained by the data obtaining unit 401 contains an object that affects user behavior. The object that affects user behavior may be a person or an object that imposes a potential threat to the user, for example, a person, a vehicle, a puddle, or an obstacle.

If the real-time environmental data does not contain an object that affects user behavior, the processing is ended. Alert information is generated by the alert unit 403 according to the real-time environmental data if the real-time environmental data contains an object that affects user behavior. An alerting manner may be, for example, vibration or ringing of the mobile terminal itself, or may be, for example, a voice, text, or picture generated according to a preset object, or may be quitting of an application, which is not limited and may be preset according to an actual need.

In this embodiment, after an environmental image generation unit 404 generates a real-time structural diagram of an environment around a mobile terminal 400, an alert unit 403 analyzes the real-time structural diagram, and generates alert information when the structural diagram contains an object that affects user behavior.

Alternatively, an environmental image generation unit 404 may generate a real-time structural diagram of an environment around a mobile terminal, and the real-time structural diagram is visibly displayed to a user as a background.

Alternatively, an environmental image generation unit 404 may generate a real-time structural diagram of an environment around a mobile terminal, the real-time structural diagram is visibly displayed to a user as a background, and an alert unit 403 further analyzes the real-time structural diagram displayed in the background, and generates alert information when the real-time structural diagram contains an object that affects user behavior. In this way, the user can learn a situation around according to the image displayed in the background and the alert from the mobile terminal 400 in order to avoid potential danger effectively.

Whether the real-time structural diagram is displayed on the mobile terminal 400 and whether the alert information is generated may be preset by the user, or may be automatically selected by the device.

Figure 5:
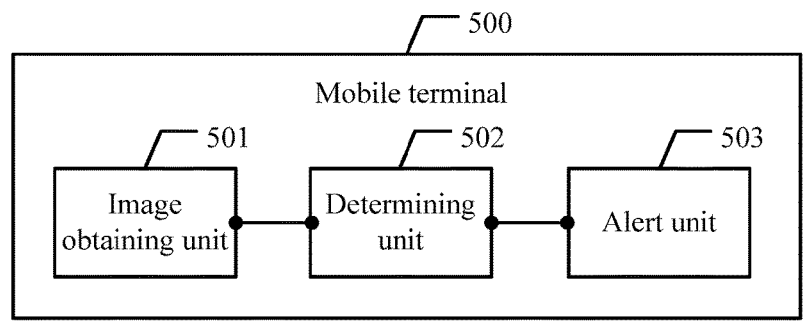
FIG. 5 is a schematic diagram of another embodiment of a mobile terminal provided in the present disclosure.

The following describes another embodiment of the mobile terminal of the present disclosure. Referring to FIG. 5, a mobile terminal 500 of this embodiment includes an image obtaining unit 501 configured to obtain a real-time image collected by a camera of the mobile terminal, where the real-time image is visibly displayed as a background on a display screen of the mobile terminal 500, and a foreground displayed on the display screen of the mobile terminal 500 is an application on the mobile terminal, a determining unit 502 configured to determine whether the real-time image contains an object that affects user behavior, and an alert unit 503 configured to alert a user when the real-time image contains an object that affects user behavior.

In this embodiment, when a real-time image collected by a camera of a mobile terminal 500 is visibly displayed to a user as a background, a determining unit 502 further analyzes the real-time image displayed in the background, determines whether the real-time image contains an object that affects user behavior, and alerts the user if the real-time image contains an object that affects user behavior. In this way, the user can learn a situation around according to the real-time image displayed in the background and the alert from the mobile terminal 500 in order to avoid potential danger effectively.

Figure 6:
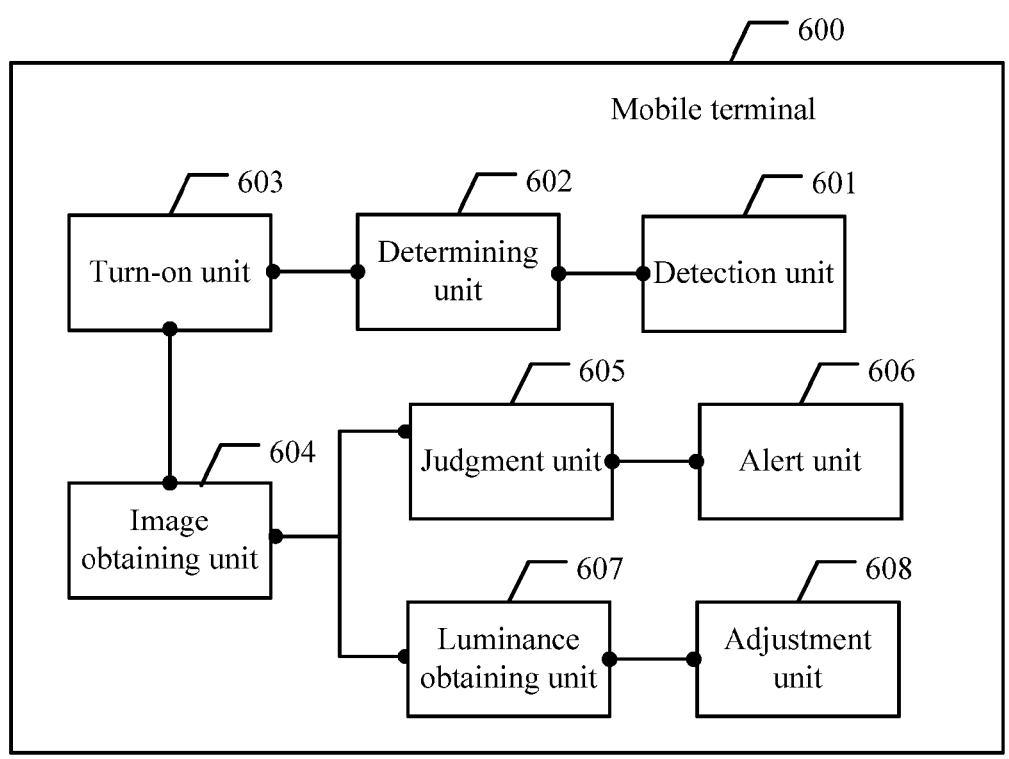
FIG. 6 is a schematic diagram of another embodiment of a mobile terminal provided in the present disclosure.

For ease of understanding, the following uses a specific embodiment to describe the mobile terminal of the present disclosure. Referring to FIG. 6, a mobile terminal 600 of this embodiment includes a detection unit 601 configured to detect a status of the mobile terminal 600, a determining unit 602 configured to determine, according to content displayed in the foreground of the mobile terminal 600, to turn on a front camera and/or a rear camera of the mobile terminal 600 when the detection unit 601 detects that the mobile terminal 600 is in a preset state, where the preset state includes being in motion and/or being outdoors, a turn-on unit 603 configured to turn on the front camera and/or the rear camera of the mobile terminal 600 according to a determining result of the determining unit 602, an image obtaining unit 604 configured to obtain a real-time image collected by the front camera and/or the rear camera of the mobile terminal 600, where the real-time image is visibly displayed as a background on a display screen (not shown) of the mobile terminal 600, and a foreground displayed on the display screen of the mobile terminal 600 is an application on the mobile terminal 600, a judgment unit 605 configured to determine whether the real-time image contains an object that affects user behavior, an alert unit 606 configured to alert a user when the real-time image contains an object that affects user behavior, a luminance obtaining unit 607 configured to obtain ambient luminance of the mobile terminal 600 and/or luminance of the background, and an adjustment unit 608 configured to adjust transparency of the foreground according to the ambient luminance of the mobile terminal 600 and/or the luminance of the background such that lower ambient luminance of the mobile terminal 600 and/or lower luminance of the background make/makes higher transparency of the foreground.

For ease of understanding, the following uses a practical application scenario to describe an interaction manner between all units in the mobile terminal 600 in this embodiment.

The detection unit 601 may use a sensor to detect a status of the mobile terminal, where the sensor may be a light sensor, a noise sensor, a motion sensor, an acceleration sensor, or the like. According to the data detected by the sensor, the determining unit 602 determines whether the mobile terminal 600 is in indoors or outdoors and whether the mobile terminal 600 is in motion or static.

Generally, when the mobile terminal 600 is indoors and/or static, a surrounding environment of the mobile terminal 600 is relatively stable, and a probability that a user is exposed to danger is relatively low. Therefore, performing no processing is practicable when the mobile terminal 600 is indoors and/or static. The probability that the user is exposed to danger is higher, and the user needs to be alerted accordingly when the mobile terminal 600 is outdoors and/or in motion.

Further, in this embodiment, after the detection unit 601 detects that the mobile terminal 600 is outdoors and/or in motion, the determining unit 602 may determine, according to content displayed in the foreground, to turn on the front camera and/or the rear camera of the mobile terminal 600. For example, when the content displayed in the foreground of the mobile terminal 600 has a high importance degree, or refers to user privacy and needs to be kept secret, the determining unit 602 determines that the front camera of the mobile terminal 600 needs to be turned on to collect a real-time image behind the user, thereby alerting the user of potential danger existing in a back environment. When the content displayed in the foreground of the mobile terminal 600 refers to no privacy or other important information, for example, when the user uses the mobile terminal 600 to surf the Internet or read an e-book, an area in front of the user is a main area in which danger exits. In this case, the determining unit 602 determines to turn on the rear camera of the mobile terminal 600 to collect a real-time image in front, thereby alerting the user of potential danger existing in front. The turn-on unit 603 turns on the front camera and/or the rear camera of the mobile terminal 600 according to a determining result of the determining unit 602.

The image obtaining unit 604 obtains a real-time image collected by the front camera and/or the rear camera of the mobile terminal 600, where the real-time image obtained by the image obtaining unit 604 is visibly displayed as a background on a display screen of the mobile terminal 600, and a foreground displayed on the display screen of the mobile terminal 600 is an application on the mobile terminal 600.

In specific implementation, the mobile terminal 600 may make foreground display translucent using the adjustment unit 608 to adjust transparency of the foreground display unit such that content displayed in the background is visible. Additionally, when the real-time image obtained by the obtaining unit 604 is collected by the front camera and the rear camera of the mobile terminal 600, a real-time image collected by the front camera and a real-time image collected by the rear camera are visibly displayed as the background on the display screen of the mobile terminal 600 in a split-screen manner, or a real-time image collected by the front camera and a real-time image collected by the rear camera are visibly displayed as the background on the display screen of the mobile terminal 600 in a switching manner according to a preset rule. The preset rule may be a fixed switching cycle, or displaying in a switching manner when the real-time image collected by a given camera is greatly changed. There may be one or more front cameras and one or more rear cameras.

The judgment unit 605 determines whether the real-time image contains an object that affects user behavior, and the alert unit 606 alerts the user if the real-time image contains an object that affects user behavior. In this embodiment, the object that affects user behavior may be a person or an object that imposes a potential threat onto the user, for example, a vehicle, a puddle, an obstacle, or a person appeared behind the user. The alert unit 606 may use a unified alerting manner for all objects to alert the user, or may preset a corresponding alerting manner for each preset object. When a determining result of the judgment unit 605 is that an object that affects user behavior appears in the real-time image, the alert unit 606 may use an alerting manner that corresponds to the object that affects user behavior to alert the user. For example, the application is terminated when the affecting object is a vehicle, and a voice or vibration alert is generated when the affecting object is a puddle.

Additionally, the alert unit 606 may further use different alerting manners according to a privacy degree or an importance degree of the foreground content. For example, when the importance degree of the foreground content is high, a voice alert is used when a person is detected behind the user. When the importance degree of the foreground content is average, a text or picture alert is generated when a person is detected behind the user. Alternatively, an emergency degree of a current scenario may be firstly determined when the real-time image is detected to contain an object that affects user behavior, and the alert unit 606 uses different alerting manners for alerting in scenarios with different emergency degrees. For example, when the real-time image is detected to contain a vehicle, a distance from the vehicle to the mobile terminal may be detected. A nearer distance between the vehicle and the mobile terminal indicates a higher emergency degree of the current scenario. For a scenario with a relatively high emergency degree, a drastic alerting manner, for example, a voice, ringing, or application quitting, may be used. For a scenario with an average emergency degree, a less drastic alert manner, for example, vibration or generation of a text or picture alert, may be used.

Additionally, after the image obtaining unit 604 obtains the real-time image collected by the front camera and/or the rear camera of the mobile terminal 600, or after the alert unit 606 uses the preset alerting manner to alert the user, the luminance obtaining unit 607 may further obtain ambient luminance of the mobile terminal 600 and/or luminance of the content displayed in the background of the mobile terminal 600, and the adjustment unit 608 adjusts transparency of the foreground according to the ambient luminance of the mobile terminal 600 and/or the luminance of the background such that lower ambient luminance of the mobile terminal 600 and/or lower luminance of the background make/makes higher transparency of the foreground. This ensures that the content displayed in the background and the content displayed in the foreground of the mobile terminal 600 are relatively clear and visible.

It should be noted that in this embodiment, whether the camera of the mobile terminal 600 is turned on is automatically determined using the detection unit 601 and the determining unit 602 in combination. In practical application, however, whether the camera is to be turned on may be determined using the detection unit 601 or the determining unit 602 alone. This means that when the detection unit 601 detects that the mobile terminal 600 is outdoors and/or in motion, the turn-on unit 603 is triggered to automatically turn on the camera of the mobile terminal 600. Alternatively, the determining unit 602 determines whether the camera is to be turned on according to the content displayed in the foreground of the mobile terminal 600. For example, when the content displayed in the foreground is relatively important or refers to privacy, the turn-on unit 603 is triggered to automatically turn on the camera of the mobile terminal 600. Further, whether the front camera or the rear camera of the mobile terminal 600 is turned on may be preset, or the user may be asked to make a selection. In addition, the camera of the mobile terminal 600 may be not automatically turned on based on determining of the mobile terminal 600, but manually turned on by the user.

In this embodiment, a turn-on unit 603 may automatically turn on a camera according to a state of a mobile terminal 600 detected by a detection unit 601 and content displayed in a foreground determined by the determining unit 602. An image obtaining unit 604 collects a real-time image using the turned-on camera. The real-time image is visibly displayed to a user as a background. Moreover, a judgment unit 605 analyzes the real-time image displayed in the background, and an alert unit 606 alerts the user when the real-time image contains an object that affects user behavior. In this way, the user can learn a situation around according to the real-time image displayed in the background and the alert from the mobile terminal 600 in order to avoid potential danger effectively.

Figure 7:
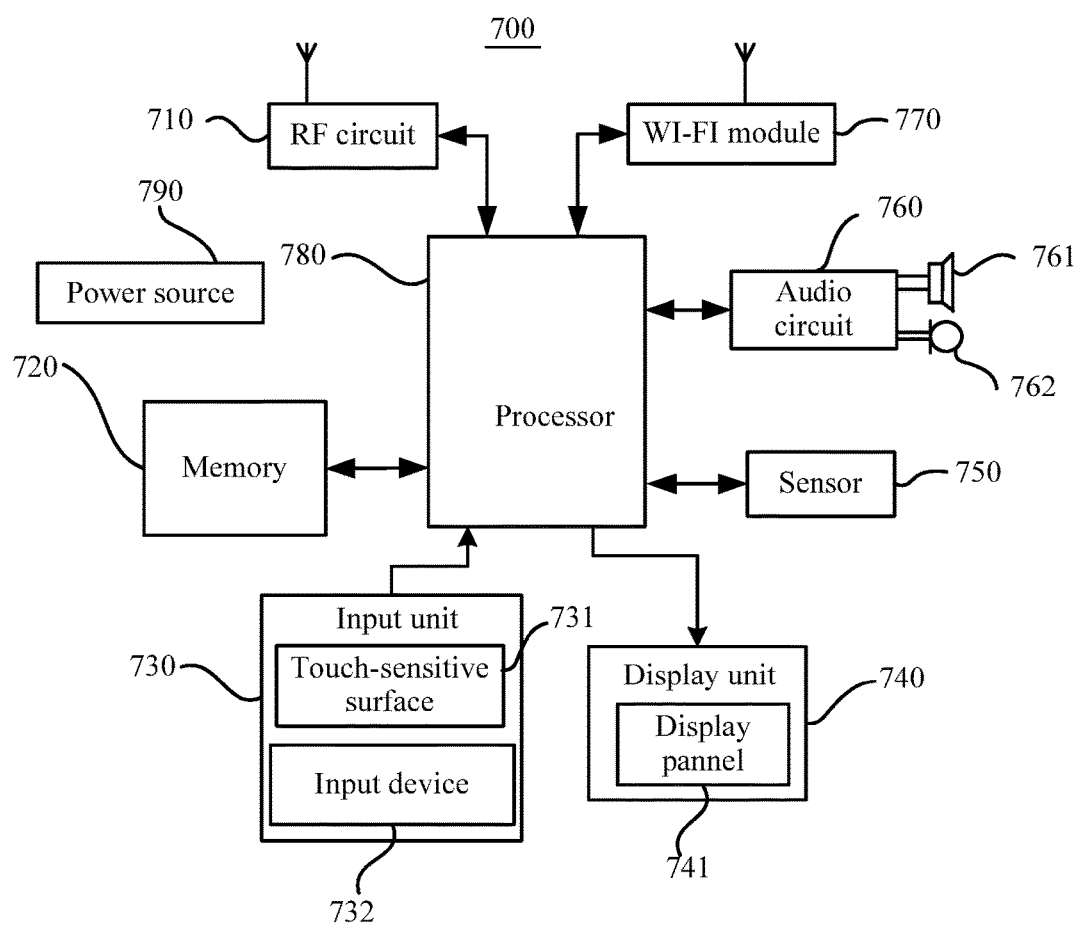
FIG. 7 is a schematic diagram of another embodiment of a mobile terminal provided in the present disclosure.

Referring to FIG. 7 below. FIG. 7 provides a schematic diagram of another embodiment of the mobile terminal in the present disclosure. A mobile terminal 700 of this embodiment may be configured to perform the alerting method provided in the foregoing embodiments. In practical application, the mobile terminal 700 may be an electronic device such as mobile phone or a tablet.

The mobile terminal 700 may include a radio frequency (RF) circuit 710, a memory 720 including one or more computer-readable storage media, an input unit 730, a display unit 740, a sensor 750, an audio circuit 760, a WI-FI module 770, a processor 780 including one or more processing cores, a power source 790 and other parts. A person skilled in the art may understand that the structure shown in FIG. 7 does not limit the mobile terminal 700. More or fewer parts than shown in the figure may be included, or some parts may be combined, or different parts may be deployed.

The RF circuit 710 may be configured for signal reception and sending during a messaging or call process. In particular, the RF circuit 710 receives downlink information of a base station and then hands the downlink information to the processor 780 for processing, and also sends uplink-related data to the base station. Generally, the RF circuit 710 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 710 may further communicate with a network and another device by means of wireless communication. Any communications standard or protocol may be used for the wireless communication, including but not limited to Global System of Mobile communication (GSM), General Packet Radio Service (GPRS), Code Division Multiple Access (CDMA), Wideband CDMA (WCDMA), Long Term Evolution (LTE), electronic mail (e-mail), SMS, and the like.

The memory 720 may be configured to store a software program and a software module. The processor 780 runs the software program and the software module stored in the memory 720 to execute various functional applications and data processing. The memory 720 may mainly include a program storage area and a data storage area. The program storage area may store an operating system, and an application program required by at least one function, such as a sound playback function or an image playback function. The data storage area may store data, such as audio data or a phone book created according to use of the storage device. In addition, the memory 720 may include a high-speed random access memory (RAM), and may further include a non-volatile memory, for example, at least one disk storage device, flash memory device, or other volatile solid-state storage devices. Correspondingly, the memory 720 may further include a memory controller to provide access to the memory 720 for the processor 780 and the input unit 730.

The input unit 730 may be configured to receive input numeral or character information, and generate signal input of a keyboard, a mouse, a joystick, or a trackball, where the input is related to user setting and functional control. Further, the input unit 730 may include a touch-sensitive surface 731 and an input device 732. The touch-sensitive surface 731 is also referred to as a touchscreen or a touchpad, and is capable of collecting a touch operation of a user on or near the touch-sensitive surface 731 (for example, an operation by a user on or near the touch-sensitive surface 731 using any appropriate object or accessory such as a finger or a stylus), and driving a corresponding connected apparatus according to a preset program. Optionally, the touch-sensitive surface 731 may include two parts, a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information to contact coordinates, and then sends the contact coordinates to the processor 780, and can also receive and execute a command sent by the processor 780. In addition, the touch-sensitive surface 731 may be implemented in multiple types, for example, a resistive type, a capacitive type, an infrared type, and a surface acoustic wave type. The input device 732 may include but is not limited to one or more of a physical keyboard, a function key, such as a volume control key or a power on/off key, a trackball, a mouse, a joystick, and the like.

The display unit 740 may be configured to display information input by the user or information provided for the user and various graphical user interfaces of the apparatus. These graphical user interfaces may include a graph, text, an icon, a video, and any combination thereof. The display unit 740 may include a display panel 741. Optionally, the display panel 741 may be configured in a form of a liquid crystal display (LCD), an organic light-emitting diode (OLED), or the like. Further, the touch-sensitive surface 731 may cover the display panel 741. After detecting a touch operation on or near the touch-sensitive surface 731, the touch-sensitive surface 731 transfers the touch operation to the processor 780 in order to determine a touch event type. Then, the processor 780 provides corresponding visual output on the display panel 741 according to the touch event type. In FIG. 7, the touch-sensitive surface 731 and the display panel 741 are used as two independent components to implement input and input functions. However, in some embodiments, the touch-sensitive surface 731 and the display panel 741 may be integrated to implement the input and output functions.

The mobile terminal 700 may further include at least one sensor 750, for example, a light sensor, a motion sensor, or another sensor. Further, the light sensor may include an ambient light sensor and a proximity sensor. The ambient light sensor may adjust luminance of the display panel 741 according to brightness of ambient light, and the proximity sensor may turn off the display panel 741 and/or backlight when the mobile terminal 700 moves close to an ear. As a motion sensor, a gravity accelerometer sensor can detect acceleration magnitudes in all directions (generally three axes), can detect a magnitude and a direction of gravity when static, and can be applied to an apparatus posture application, such as screen switching between landscape and portrait, related games, and magnetometer posture calibration), a function related to vibration recognition (for example, a pedometer or tap), and the like. Other sensors such as a gyroscope, a barometer, a hygrometer, a thermometer, and an infrared sensor that may also be configured in the mobile terminal 700 are not described herein.

The audio circuit 760, a loudspeaker 761, and a microphone 762 can provide an audio interface between the user and the mobile terminal. The audio circuit 760 may transmit, to the loudspeaker 761, an electrical signal resulting from conversion of received audio data, and the loudspeaker 761 converts the electrical signal into an acoustic signal and outputs the acoustic signal. In another aspect, the microphone 762 converts a collected acoustic signal into an electrical signal. The audio circuit 760 receives the electrical signal and converts the electrical signal into audio data, and outputs the audio data to the processor 780 for processing. Processed audio data is sent to, for example, another apparatus by way of the RF circuit 710, or audio data is output to the memory 720 for further processing. The audio circuit 760 may further include an earplug jack in order to provide communication between an external earphone and the mobile terminal.

WI-FI is a short-distance wireless transmission technology. With the WI-FI module 770, the mobile terminal 700 can help the user, for example, receive or send an e-mail, browse a webpage, and access streaming media. The WI-FI module 770 provides the user with wireless broadband Internet access. Although FIG. 7 shows the WI-FI module 770, it can be understood that the WI-FI module 770 is not a necessary part of the mobile terminal 700 and may be well omitted as needed without departing from the essence of the present disclosure.

The processor 780 is a control center of the mobile terminal, and is connected to all components of the entire mobile terminal using various interfaces and lines. By running or executing a software program and/or module stored in the memory 720 and calling data stored in the memory 720, the processor 780 executes various functions of the storage device and processes data in order to perform overall monitoring on the storage device. Optionally, the processor 780 may include one or more processing cores. Optionally, an application processor and a modem processor may be integrated into the processor 780, where the application processor mainly processes an operating system, a user interface, an application program, and the like, and the modem processor mainly processes wireless communication. It can be understood that the modem processor may alternatively not be integrated into the processor 780.

The mobile terminal 700 may further include the power source 790, such as a battery that supplies power to all the components. Optionally, the power source may be logically connected to the processor 780 by means of a power source management system in order to implement functions, such as charge management, discharge management, and power consumption management, using the power source management system. The power source 790 may further include one or more direct current or alternating current power sources, a rechargeable system, a power source fault detection circuit, a power converter or a power inverter, a power status indicator and any other components.

Although not shown, a camera, a BLUETOOTH module, and the like may be further included in the mobile terminal 700, and details are not further described herein. Further, in this embodiment, the mobile terminal 700 includes a memory 720, and one or more programs that are stored in the memory 720, and is so configured that one or more processors 780 execute instructions included in the one or more programs, where the instructions are used to perform the operations of obtaining real-time data of an environment around the mobile terminal using a sensor, detecting whether the real-time environmental data contains an object that affects user behavior, and generating alert information according to the real-time environmental data if the real-time environmental data contains an object that affects user behavior, or obtaining a real-time image collected by a camera of the mobile terminal, where the real-time image is visibly displayed as a background on a display screen of the mobile terminal, and a foreground displayed on the display screen of the mobile terminal is an application on the mobile terminal, determining whether the real-time image contains an object that affects user behavior, and alerting a user if the real-time image contains an object that affects user behavior.

It should be noted that the mobile terminal 700 provided in this embodiment of the present disclosure may further be configured to implement other functions in the foregoing apparatus embodiments, and details are not described repeatedly herein.

In the several embodiments provided in the present application, it should be understood that the disclosed apparatus may be implemented in other mannersand the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device, which may be a personal computer, a server, or a network device to perform all or a part of the steps of the methods described in the embodiments of the present disclosure. The foregoing storage medium includes any medium that can store program code, such as a universal serial bus (USB) flash drive, a read-only memory (ROM), a RAM, a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An alerting method, comprising:
    turning on at least one of front sensor and a rear sensor of the mobile terminal when a status of the mobile terminal comprises being outdoors;
    detecting whether content displayed in a foreground of a display screen of the mobile terminal meets a condition of a user of the mobile terminal by identifying a type of application operating in the foreground, wherein the condition of the user is associated with either privacy information of the user or information of high importance to the user, and wherein the foreground of the display screen comprises an application on the mobile terminal with the content;
    turning on the at least one front sensor and the rear sensor when detecting that the content displayed in the foreground meets the condition of the user of the mobile terminal;
    obtaining real-time data of objects or persons in an environment around the mobile terminal as a real-time structural diagram using the front and the rear sensors when the content displayed in the foreground of the display screen meets the condition;
    visibly displaying a real-time image from the front sensor and a real-time image from the rear sensor as a background on the display screen in a split-screen manner;
    detecting whether the real-time data of objects or persons in the environment contains either an object or a person that can view the content;
    generating alert information on the mobile terminal according to the real-time data of objects or persons in the environment when the real-time data of objects or persons in the environment contains the object or the person that can view the content; and
    displaying an alert according to the alert information on the mobile terminal.

2. The method according to claim 1, wherein the object or persons that can view the content displayed in the foreground is obtained by means of user presetting, automatic identification of the mobile terminal, or obtaining network data.

3. The method according to claim 1, wherein the real-time data of objects or persons in the environment comprises one or more types of the following data:
    a sound;
    an image;
    a height of the object;
    a thickness of the object; and
    a distance and an angle between the object and the mobile terminal that are detected by the sensor.

4. The method according to claim 1, wherein after detecting whether the real-time data of objects or persons in the environment comprises the object that can view the content, the method further comprises generating the real-time image of objects or persons in the environment according to the real-time data of objects or persons in the environment.

5. The method according to claim 4, wherein the real-time image of objects or persons in the environment is an image of a real-world scene or a diagram of a virtual structure.

6. The method according to claim 1, wherein the front and the rear sensors comprise a respective front camera and a rear camera of the mobile terminal, and wherein the method further comprises obtaining the real-time image from the front and the rear cameras of the mobile terminal.

7. The method according to claim 6, wherein before obtaining the real-time image, the method further comprises:
    detecting a status of the mobile terminal;
    turning on the front camera and the rear camera when detecting that the mobile terminal is in a preset state; and
    setting the at least one front and the rear cameras of the mobile terminal to collect the real-time image, wherein the preset state comprises being in motion.

8. The method according to claim 6, wherein the real-time image from the front camera and the real-time image from the rear camera are visibly displayed as the background on the display screen of the mobile terminal in a switching manner according to a preset rule when the obtained real-time image is from the front camera and the rear camera of the mobile terminal.

9. The method according to claim 6, wherein after obtaining the real-time image, the method further comprises:
    obtaining ambient luminance of the mobile terminal; and
    adjusting transparency of the foreground according to the ambient luminance of the mobile terminal such that a lower ambient luminance of the mobile terminal makes a higher transparency of the foreground.

10. The method according to claim 6, wherein after obtaining the real-time image, the method further comprises:
    obtaining luminance of the background; and
    adjusting transparency of the foreground according to the luminance of the background such that a lower luminance of the background makes a higher transparency of the foreground.

11. A mobile terminal, comprising:
    a memory comprising instructions;
    a processor coupled to the memory, wherein the instructions cause the processor to be configured to:

turn on at least one of front sensor and a rear sensor of the mobile terminal when a status of the mobile terminal comprises being outdoors;

detect whether content displayed in a foreground of a display screen of the mobile terminal meets a condition of a user of the mobile terminal by identifying a type of application operating in the foreground, wherein the condition of the user is associated with either privacy information of the user or information of high importance to the user, and wherein the foreground of the display screen comprises an application on the mobile terminal with the content;

turning on the alt least one front sensor and the rear sensor when detecting that the content displayed in the foreground meets the condition of the user of the mobile terminal;

obtain real-time data of objects or persons in an environment around the mobile terminal as a real-time structural diagram using the front and the rear sensors when the content displayed in the foreground of the display screen meets the condition;

visibly display a real-time image from the front sensor and a real-time image from the rear sensor as a background on the display screen in a split-screen manner;

detect whether the real-time data of objects or persons in the environment contains either an object or a person that can view the content;

generate alert information according to the real-time data of the environment when the real-time data of objects or persons in the environment contains the object or the person that can view the content; and display an alert according to the alert information on the mobile terminal.

12. The mobile terminal according to claim 11, wherein the instructions further cause the processor to be configured to generate a real-time image of objects or persons in the environment according to the real-time data of objects or persons in the environment, and wherein the real-time image of objects or persons in the environment is visibly displayed as the background on a display screen of the mobile terminal.

13. The mobile terminal according to claim 12, wherein the real-time image of objects or persons in the environment is an image of a real-world scene or a diagram of a virtual structure.

14. The mobile terminal according to claim 11, wherein the instructions further cause the processor to be configured to obtain the real-time image from a front camera and a rear camera of the mobile terminal, wherein the real-time image is visibly displayed as the background on the display screen of the mobile terminal.

15. The mobile terminal according to claim 14, wherein the instructions further cause the processor to be configured to:
detect a status of the mobile terminal;
turn on the at least one front camera and the rear camera when the status of the mobile terminal is in a preset state; and
set the at least one front and the rear cameras to collect the real-time image, wherein the preset state comprises being in motion.

16. The mobile terminal according to claim 14, wherein the real-time image from the front camera and the real-time image from the rear camera are visibly displayed as the background on the display screen of the mobile terminal in a switching manner according to a preset rule when the obtained real-time image is from the front camera and the rear camera of the mobile terminal.

17. The mobile terminal according to claim 14, wherein the instructions further cause the processor to be configured to:
obtain ambient luminance of the mobile terminal; and
adjust transparency of the foreground according to the ambient luminance of the mobile terminal such that a lower ambient luminance of the mobile terminal makes a higher transparency of the foreground.

18. The mobile terminal according to claim 14, wherein the instructions further cause the processor to be configured to:
obtain luminance of the background; and
adjust transparency of the foreground according to the luminance of the background such that a lower luminance of the background makes a higher transparency of the foreground.

19. The method according to claim 1, further comprising generating an alert from the alert information, wherein the alert comprises at least one of vibration, ringing, a voice notification, text notification, a picture generated according to a predefined object, or quitting the application according to the predefined object.

20. The mobile terminal according to claim 11, wherein the instructions further cause the processor to be configured to generate an alert from the alert information, wherein the alert comprises at least one of vibration, ringing, a voice notification, text notification, a picture generated according to a predefined object, or quitting the application according to the predefined object.

* * * * *